United States Patent [19]

Reed et al.

[11] 4,036,580
[45] July 19, 1977

[54] TURBINE-DRIVEN AIR-POWERED FLARE

[75] Inventors: Robert D. Reed; Robert E. Schwartz; Roger K. Noble, all of Tulsa, Okla.

[73] Assignee: John Zink Company, Tulsa, Okla.

[21] Appl. No.: 693,000

[22] Filed: June 4, 1976

[51] Int. Cl.[2] ........................................... F23D 13/20
[52] U.S. Cl. .................... 431/202; 23/277 C; 431/4; 431/5; 431/163; 431/190
[58] Field of Search ............... 431/4, 5, 163, 190, 431/202; 23/277 C; 60/70

[56] References Cited

U.S. PATENT DOCUMENTS

| | | | |
|---|---|---|---|
| 3,697,231 | 10/1972 | Reed | 23/277 C |
| 3,771,940 | 11/1973 | Stanahan et al. | 431/4 |
| 3,840,320 | 10/1974 | Desty et al. | 431/4 |
| 3,954,385 | 5/1976 | Reed et al. | 431/202 |
| 3,973,899 | 8/1976 | Reed et al. | 431/202 |

Primary Examiner—Edward G. Favors
Attorney, Agent, or Firm—Head, Johnson & Chafin

[57] ABSTRACT

An air powered flare in which the blower or fan which provides the primary combustion air, is driven by a steam turbine, and the exhaust steam from the turbine is inserted into the stack to be mixed with the compressed primary air moving upwardly to a burner at the top of the flare stack. The mixture of low pressure steam and condensate in the exhaust from the turbine with the primary air serves to chemically improve the combustion of the fuel issuing from the burner, so as to facilitate its complete and smokeless combustion. Alternatively, it is possible to inject live steam into the column of primary combustion air in addition to or in place of the exhaust steam. Further, the live steam, and/or the exhaust steam can be ejected from nozzles surrounding the top of the flare stack and injected directly into the flame above the burner at the top of the flare stack.

9 Claims, 2 Drawing Figures

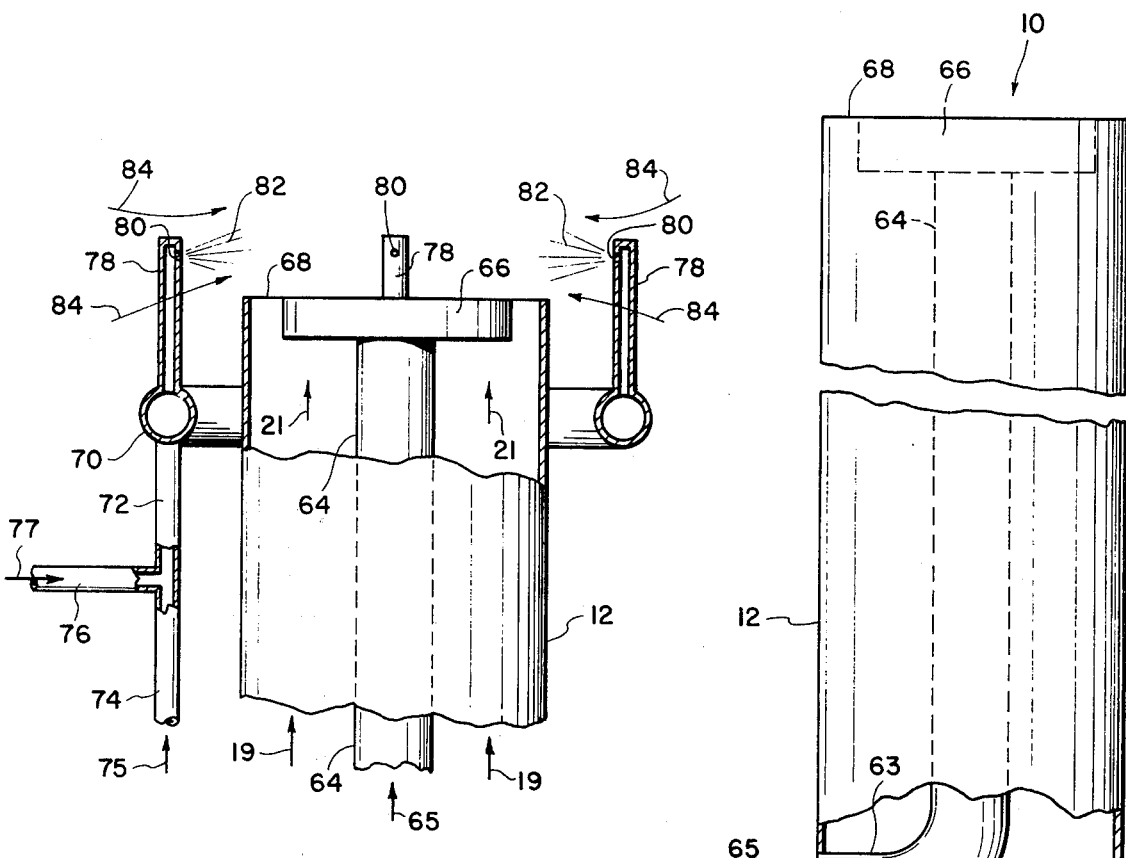
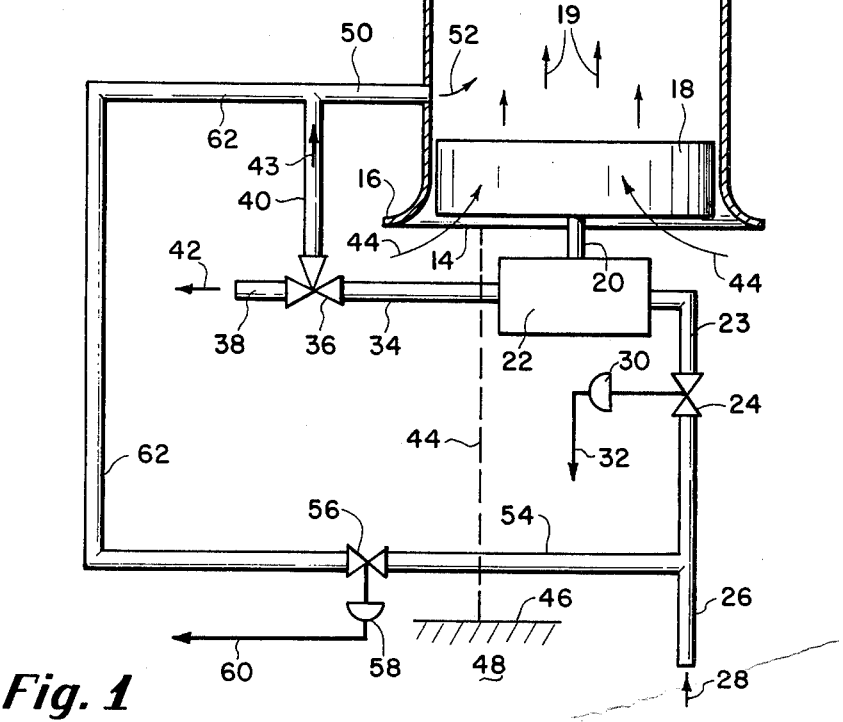
Fig. 2
Fig. 1

TURBINE-DRIVEN AIR-POWERED FLARE

BACKGROUND OF THE INVENTION

This invention lies in the field of the flare burning of waste gases.

More particularly this invention lies in the field of air powered flare stacks.

Still more particularly this invention lies in the field of steam driven blowers or fans to provide primary air under pressure, for the combustion of gases at a burner at the top of the flare stack, plus the step of injecting the exhaust steam either into the rising column of combustion air upstream from the burner, or injecting it into the flame downstream from the burner, to chemically facilitate the complete and smokeless combustion.

In the prior art, it has been customary to design at least two basic types of flares for the smokeless combustion of waste gases. One type which is well known in the arts makes use of significant quantities of expensive "live" steam in various manners for inspiration of air; for supply of turbulence and addition of water-hydrocarbon chemistry to the burning of emergency flare-vented hydrocarbon gases so as to provide smoke-free burning. Another common type is the air powered flare in which primary combustion air is compressed by means of blowers or fans so that it has sufficient kinetic energy with the energy of the gas, to turbulently mix with the gas issuing from the burner to provide conditions for complete and smokeless combustion.

In the prior art of air driven flares, the blowers or fans are generally driven electrically, primarily because of the simplicity and convenience. However, even with air driven flares it is sometimes necessary to inject steam into the flame in order to provide complete and smokeless combustion. This stand-by demand for significant quantities of steam for use in smoke suppression as emergency vented hydrocarbons are flare burned, for safety in the operation of petroleum refineries, and petrochemical, and chemical plants, is a source of energy waste as well as a notable financial burden.

It is therefore a primary objective of this invention to provide a more efficient system whereby the power to drive the air compressing means is operated by a steam turbine, and the exhaust steam from the turbine is used to improve the combustion of the waste gases.

It is a further object of this invention not only to use the steam for driving the compressing means for the primary combustion air, but also to utilize the exhaust steam and condensate to be either mixed with the primary combustion air upstream of the burner, or to be injected into the flame downstream of the burner, so as to chemically promote more complete and smokeless combustion.

SUMMARY OF THE INVENTION

These and other objects are realized and the limitations of the prior art are overcome in this invention by utilizing as the driving means for an air powered flare, a steam driven means, such as a steam turbine. The exhaust steam from the turbine is then utilized to improve the combustion as needed in the flare, by being injected into the stack upstream of the burner to be mixed with the primary combustion air, or it is injected through nozzles into the flame, downstream of the burner. In the event that the chemical composition of the fuel is such that steam is not required then the exhaust steam can be vented direct to the atmosphere.

At times when the exhaust steam is not sufficient, or cannot be used for combustion improvement, such as in very cold weather, where the exhaust steam would be condensed and frozen into droplets, then live steam can be injected as necessary as is conventionally done.

BRIEF DESCRIPTION OF THE DRAWINGS

These and other objects and advantages of this invention and a better understanding of the principles and details of the invention will be evident from the following description taken in conjunction with the appended drawings in which;

FIG. 1 illustrates one embodiment of this invention.

FIG. 2 represents an alternate embodiment of this invention.

DESCRIPTION OF THE PREFERRED EMBODIMENT

Before explaining the present invention in detail, it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein are for the purpose of description, and not of limitation.

Referring now to the drawing, and in particular to FIG. 1, the numeral 10 indicates generally a flare stack of this invention. The flare stack comprises an outer cylindrical conduit 12 generally vertical in position, which is supported on legs shown schematically as dashed line 44 which rest on the surface 46 of the earth 48, and are conventional in all respects. A fuel pipe 63 is provided through the wall 12 of the flare stack, which is bent upwardly 64 along the axis of the cylinder 12, and supports a burner 66 at the top 68 of the flare stack 12. Waste fuel gas indicated by the arrow 65 flows from an outside source into the pipe 63 and up to pipe 64 to the burner.

Though not shown, conventional fuel ignition means are provided at the top 68, so that the fuel as ejected from the burner 64 will be ignited.

At the lower end of the vertical conduit 12 is a blower or fan 18 or similar device, as is well known in the art, which is rotated by a shaft 20, driven by a steam driven means 22 such as a steam turbine. The stack 12 will preferably have a flared bottom end 16 so as to facilitate the inward flow of air in accordance with arrows 44.

As in conventional air powered flares, the energy imparted to the entering air 44 to provide a rising column 19 of partially compressed air, moving at considerable velocity, which, when passing the burner 64 in accordance with arrows 21, generates a turbulent mixing with the gas, which is ejected from orifices or ports in the burner arms. The kinetic energy of the air (and of the gas) provides the energy for turbulent mixing of the air and fuel, which is a necessary condition of the complete and smokeless combustion of the gas. Because of the high velocity of air and gas at the top 68 of the flare stack, only a portion of the stoichiometric air is required at the blower 18, since secondary air will be induced into the flame at the top 68 of the flare stack, in accordance with arrows 84.

It is well known that steam injected into the primary air upstream of the burner, or injected into the flame downstream of the burner, by the well known chemistry of the breakdown of hydrocarbon gases into hydrogen and carbon monoxide, will facilitate the complete and smokeless combustion. Consequently the exhaust steam from the turbine 22, which flows through pipe 34 to a three way valve 36, may alternatively be vented through pipe 38 to the atmosphere in accordance with arrow 42, or it may be passed through pipe 40 in accordance with arrow 43, into pipe 50, to be injected into the rising column of air 19 in accordance with arrow 52. The exhaust steam will be low pressure steam with some condensate in the form of finely divided water, all of which will be effective in promoting the improved combustion.

If the fuel gas that is being burned is such that steam is not required in order to completely burn the gas, then the valve 36 is turned so as to vent the steam 42 to the atmosphere. If steam would be advantageous and helpful in facilitating the complete combustion of the gas, then the valve 36 is turned to send the steam, in accordance with arrows 43, and 52, to be mixed with the primary air 19 upstream of the burner. If the type of gas being flared requires still more steam, then live steam can be injected in addition to exhaust steam 43. The live steam is supplied to the turbine 22, and arrives through pipe 26 in accordance with arrow 28, and is passed through valve 24 and pipe 23 to the turbine. The live steam 28 is also passed by pipe 54, through control valve 56, pipes 62 and 50 and in accordance with arrow 52 into the primary air.

The control valve 24 for the turbine 22 is controlled by means 30, and control line 32. Since the turbine 22 is not required unless there is gas flowing in accordance with arrow 65, the control means 32 will shut down the turbine except when gas is being flared. Similarly the valve 56 which passes live steam into the air 19 is controlled by means 58 and the control signal on line 60. Control 32 would normally be automatic control, which is operated at the same time the valve flowing gas 65 is operated. The control 60 might be automatic or it will preferably be a manual control dependent upon the type of gas being flared.

It is therefore seen that with the use of a conventional air powered flare, by the simple substitution of a steam driven power source, such as a steam turbine, for a comparable electrical drive, the same energy and efficiency can be provided, comparable to that obtained when using electrical power to drive the blower 18. In addition, the exhaust steam can be utilized to improve the burning condition.

Thus a notable increase in smokeless burning capability for the air powered flare is provided by substituting a steam turbine drive for the fan or blowers used in connection with the flare, rather than an electrical drive, and using the exhaust steam from the turbine drive to be mixed with the primary air supplied by the fan or blower, en route to the combustion zone, as the air powered flare operates. In so doing, the hydrocarbon-water chemistry is added to the combustion process to add its smoke-suppressive effect.

Such steam use represents a small fraction of the steam demanded for smoke suppression when used without the air powered flare, and it is used only for the small time during which emergency flaring of relieved hydrocarbons is required to significantly increase the smoke suppressive capability of the air powered flare.

The fan or blower requires power for operation only when operated, that is, whenever gas is to be flared. When a steam turbine drive is substituted for the electrical motor drive, combined with the delivery of the exhaust steam from the turbine to the air en route to the burning zone, the greatest smoke suppressive capability results. It is to be seen that steam delivered to the turbine for power is caused to provide a second usuable service in smoke suppression, at no additional cost.

The main value of the steam 52 supplied and mixed with the primary air, is to provide water in finely divided form in either vapor, or as fine droplets. However, because of the low pressure steam exhausted from the turbine, in very cold weather this steam will be condensed into pellets of ice, which will not mix with the primary air. It will therefore serve little purpose to be inserted into the primary air column. Consequently, in severe weather the exhaust steam would be vented to the atmosphere in accordance with arrow 42. In that case, if additional steam is required, then live steam will be bypassed from pipe 26 to pipe 54, valve 56, pipe 62, pipe 50, and into the space of the rising column of air 19.

In the past, the improved combustion of flare gas has been carried on by the use of water droplets or steam injected into the flame downstream of the burner, in addition to or in place of injection into the primary combustion air upstream of the burner. It is possible therefore as shown in FIG. 2 to take the exhaust steam from line 40, for example, and to inject it in accordance with arrow 75 into pipes 74 and 72, into a manifold 70 which encircles the top 68 of the flare stack 12. This manifold has a plurality of circumferentially spaced pipes 78 extending above the burner, which carry one or more orifices 80 through which the exhaust steam 75 can be ejected as jets 82 into the flame above the burner 66. These jets 82 will also induce secondary air in accordance with arrows 84 to turbulently mix with the steam and the flame, to more completely burn the gas, as is commonly known in the art.

In FIG. 1, live steam was provided by valve 56 in addition to or as an alternate, in cases of need for a greater amount of steam than that provided by the drive of the turbine. In FIG. 2, live steam can also be injected in accordance with arrow 77 into pipe 76 and then through pipe 72 into the manifold 70 so as to provide increased quantity of steam to be injected into the flame to provide the necessary water for chemical disassociation and combustion in the flame.

To summarize the invention, there is used in a conventional air powered flare, as a drive for the air compressing means, a steam driven device, such as a steam turbine, with the additional action of injecting the exhaust steam and condensate to be mixed with the primary air upstream of the burner, or alternatively to be injected through nozzles into the flame downstream of the burner. In case additional steam is required, as is conventionally done, live steam can be injected, in addition to the exhaust steam, either into the primary air or into the flame.

While FIGS. 1 and 2 are drawn to show two separate embodiments, it will be clear that the steam 52 can be injected alone, or 82 can be injected alone, or both can be injected together. Also the steam injections 52 and 82 can be either or both exhaust steam or live steam, in various combinations.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplifications, but is to be limited only by the scope of the attached claim or claims, including the full range of equivalency to which each element thereof is entitled.

What is claimed:

1. In an air powered flare combustion apparatus comprising:
   a. a flare stack, comprising an outer cylindrical wall;
   b. primary air driving means, mounted at the upstream end of said flare stack;
   c. internal cylindrical conduit means for the flow of waste gases to be flared;
   d. burner means for burning said waste gases attached to said internal conduit and positioned at the downstream end of said outer cylindrical wall, and ignition means;

the improvement in means to provide complete and smokeless combustion of said waste gases, comprising;
   e. said primary air driving means comprising steam powered means; and
   f. means to inject the exhaust steam from said steam powered air driving means into said combustion apparatus;

whereby said exhaust steam will chemically participate in the combustion process and assist in the complete and smokeless combustion of said waste gases.

2. The apparatus as in claim 1 including means to inject said exhaust steam through said outer cylindrical wall upstream of said burner, whereby said exhaust steam and primary air will mix before reaching said burner.

3. The apparatus as in claim 1 including means to inject said exhaust steam through nozzles into the flame downstream of said burner, whereby said exhaust steam will induce secondary air and will mix with said secondary air and the burning gas downstream of said burner.

4. The apparatus as in claim 1 including means to supplement said exhaust steam with a selected quantity of live steam.

5. The apparatus as in claim 3 in which said means to inject said exhaust steam comprises;
   a. a manifold surrounding the downstream end of said outer wall,
   b. means to carry said exhaust steam to said manifold;
   c. a plurality of nozzles connected to said manifold directed inwardly to the flame downstream of said burner.

6. The apparatus as in claim 5 in which each of said nozzles is in a small pipe connected to said manifold and extending downstream of said burner;
   whereby there will be minimum obstruction to the induction of secondary air into the flame.

7. The apparatus as in claim 1 including means to vent said exhaust steam to the atmosphere.

8. The apparatus as in claim 1 including control means to supply live steam to drive said steam driven means only when waste gases are to be flared.

9. The apparatus as in claim 1 in which said steam driven means is a turbine and said primary air driving means is a fan.

* * * * *